J. S. HOLLIDAY.
HORSESHOE CALK.
APPLICATION FILED FEB. 11, 1913.
1,073,236.
Patented Sept. 16, 1913.
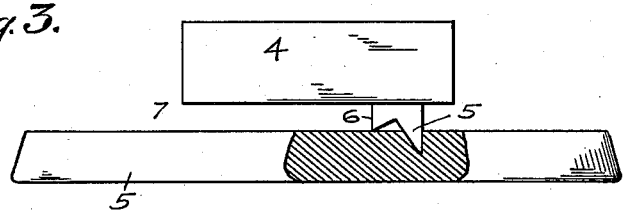
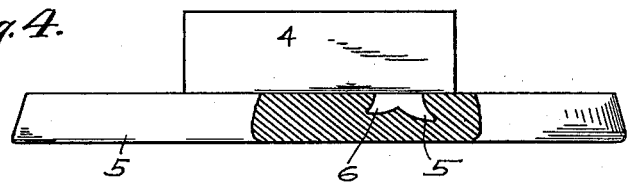
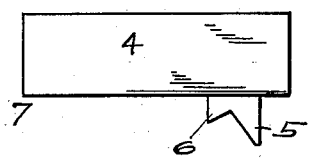 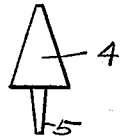
WITNESSES:
L. B. Woerner
J. H. Swan
INVENTOR,
Jaquelin S. Holliday,
By Minturn & Woerner,
Attorneys.

UNITED STATES PATENT OFFICE.

JAQUELIN S. HOLLIDAY, OF INDIANAPOLIS, INDIANA.

HORSESHOE-CALK.

1,073,236.   Specification of Letters Patent.   Patented Sept. 16, 1913.

Application filed February 11, 1913. Serial No. 747,679.

*To all whom it may concern:*

Be it known that I, JAQUELIN S. HOLLIDAY, a citizen of the United States, residing at Indianapolis, in the county of Marion and State of Indiana, have invented certain new and useful Improvements in Horseshoe - Calks, of which the following is a specification.

The object of this invention is to provide a calk for a horseshoe having welding lugs thereon, which, when the calk is positioned on the red hot shoe, may be readily driven into the soft hot metal to position the calk, and in which the welding lugs are shaped in such a manner that when they are completely embedded in the hot metal of the shoe by the driving home of the calk, points on the welding lug will be caused to diverge from each other thereby widening the inner ends of the welding lugs and locking the calks in the desired position on the shoe. The calk thus locked to the shoe will retain its position on the latter during its subsequent heating, and welding operation.

I accomplish the objects of the invention by the means shown in the accompanying drawing, in which—

Figure 1 is a side view of a calk for the toe of a horseshoe, embodying my invention. Fig. 2 is an end view of same. Fig. 3 is a view in front elevation and partial vertical section of a horseshoe and my improved toe calk, showing the welding lug partly driven home into the shoe, and Fig. 4 shows the horseshoe in like view and section with the calk in contact with the shoe and the welding lug in its finished holding position.

Like characters of reference indicate like parts throughout the several views of the drawing.

The calk 4 is of the usual form for horseshoe toe calks, and has a welding lug on the face which is to contact with the horseshoe.

5 is the horseshoe, shown in the drawings in an inverted position from that in which the shoe is worn on the hoof of the horse, but in the position in which the shoe is most conveniently held by the blacksmith during the operation of welding on the calk. The welding lug preferably comprises a body portion of thin material with opposite parallel sides or sides which taper slightly, as shown in Fig. 2 of the drawings, to make it enter the shoe more readily. This body portion terminates with two barbs or points 5 and 6, preferably of different lengths. The longer point 5 has an outer edge at right angles to the face of the calk 4 to which it is attached, and it has an oblique opposite edge which intersects the adjacent oblique inner edge of the shorter point 6. The opposite edge of the calk 6, being the inner edge of the welding lug as a whole, as here shown, is at right angles to the adjacent face of the calk, and parallel with the outer edge of the lug.

The welding lugs, as above described, are preferably located at one side of the middle of the calk, as shown.

In applying a calk of the above character to a horseshoe, the shoe is first heated to a temperature which will permit the welding lug of the calk to be readily driven into it. The calk, still cold, is then placed in position upon the shoe resting upon the point 5 of the welding lug and upon the edge 7 of the opposite end of the calk. Then by striking the calk with a hammer opposite the welding lug the latter is driven into the relatively soft metal of the shoe. The point 5 first penetrates the soft metal to the position shown in Fig. 3 which quickly locates the calk. Then the further progress of the welding lug causes the point 6 to enter the shoe and because of the parallel outer edges of the lug and oblique inner edges of the two points 5 and 6 the metal displaced to make room for the points 5 and 6 will be crowded into the crotch of the two points where, by the further progress of the welding lug into the soft metal of the hot shoe, the points 5 and 6 will be bent in opposite directions by the pressure against their inner edges of the compacted metal of the shoe, with the result that the welding lug will be broadened by the spreading of the points, and the calk thereby securely locked in position on the shoe, as is desired for the further operations of heating both calk and shoe and the welding of same together.

While I have described my invention with more or less minuteness as regards details of construction and arrangement and as being embodied in certain precise forms, I do not desire to be limited thereto unduly or any more than is pointed out in the claim. On the contrary, I contemplate all proper changes in form, construction and arrangement, the omission of immaterial elements and the substitution of equivalents as circumstances may suggest or necessity render expedient.

I claim:

A horseshoe calk comprising a body having a lug on one face, said lug having outside edges substantially perpendicular to the face of the calk and a pair of points formed by a single V-shaped indent between the inside edges of the points, one of which points is longer than the other.

In witness whereof, I have hereunto set my hand and seal at Indianapolis, Indiana, this 6th day of February, A. D. on thousand nine hundred and thirteen.

JAQUELIN S. HOLLIDAY. [L. S.]

Witnesses:
F. W. WOERNER,
J. A. MINTURN.

---

Copies of this patent may be obtained for five cents each, by addressing the "Commissioner of Patents, Washington, D. C."